(12) United States Patent
Miyabe et al.

(10) Patent No.: US 10,550,775 B2
(45) Date of Patent: Feb. 4, 2020

(54) VAPORIZED FUEL PROCESSING APPARATUS

(71) Applicant: AISAN KOGYO KABUSHIKI KAISHA, Obu-shi, Aichi-ken (JP)

(72) Inventors: Yoshikazu Miyabe, Obu (JP); Junya Kimoto, Obu (JP)

(73) Assignee: AISAN KOGYO KABUSHIKI KAISHA, Obu-Shi, Aichi-Ken (JP)

(*) Notice: Subject to any disclaimer, the term of this patent is extended or adjusted under 35 U.S.C. 154(b) by 0 days.

(21) Appl. No.: 15/507,336

(22) PCT Filed: Aug. 27, 2015

(86) PCT No.: PCT/JP2015/074143
§ 371 (c)(1),
(2) Date: Feb. 28, 2017

(87) PCT Pub. No.: WO2016/035653
PCT Pub. Date: Mar. 10, 2016

(65) Prior Publication Data
US 2017/0282706 A1    Oct. 5, 2017

(30) Foreign Application Priority Data
Sep. 1, 2014  (JP) .................................. 2014-176950

(51) Int. Cl.
*F02D 41/00*  (2006.01)
*B60K 15/035*  (2006.01)
(Continued)

(52) U.S. Cl.
CPC ...... *F02D 41/004* (2013.01); *B60K 15/03519* (2013.01); *F02D 41/0032* (2013.01);
(Continued)

(58) Field of Classification Search
CPC . F02D 41/004; F02D 41/0042; F02D 41/0045
See application file for complete search history.

(56) References Cited

U.S. PATENT DOCUMENTS 5,497,754 A * 3/1996 Ito ..................... B60K 15/03519
                                                          123/520
5,769,390 A * 6/1998 Ando .................... F16K 31/046
                                                          251/129.05
(Continued)

FOREIGN PATENT DOCUMENTS

DE         19503019 A1    8/1995
DE      102013016984 A1   4/2014
(Continued)

OTHER PUBLICATIONS

Japanese Office Action dated Oct. 31, 2017, for Japanese Application No. 2016-546592 (2 p.).
(Continued)

*Primary Examiner* — Kevin R Steckbauer
(74) *Attorney, Agent, or Firm* — Conley Rose, P.C.

(57) ABSTRACT

In a vaporized fuel processing apparatus in which fuel vapor within a fuel tank is adsorbed by a canister, the adsorbed vaporized fuel is drawn to an engine, a closing valve is provided connecting the fuel tank and the canister for controlling communication between the fuel tank and the canister, and a purge valve is provided connecting the canister and the engine for controlling communication between the canister and the engine. The vaporized fuel processing apparatus includes an internal pressure sensor configured to detect a pressure of a space within the fuel tank as an internal pressure, and a closing valve control means configured to open the closing valve for supplying an atmospheric pressure to the fuel tank via the canister when the sensor detects that the internal pressure of the fuel tank
(Continued)

is negative, while the purge valve is closed. Therefore, the air/fuel ratio is prevented from being disturbed.

8 Claims, 11 Drawing Sheets

(51) Int. Cl.
*F02D 41/14* (2006.01)
*F02M 25/08* (2006.01)

(52) U.S. Cl.
CPC ..... *F02D 41/0042* (2013.01); *F02D 41/1454* (2013.01); *F02M 25/0836* (2013.01); *B60K 2015/03514* (2013.01); *B60K 2015/03585* (2013.01); *B60Y 2400/306* (2013.01)

(56) References Cited

U.S. PATENT DOCUMENTS

| | | | | |
|---|---|---|---|---|
| 6,105,556 | A * | 8/2000 | Takaku | F02M 25/0809 123/520 |
| 6,305,361 | B1 * | 10/2001 | Takaku | F02M 25/0809 123/520 |
| 6,374,811 | B1 * | 4/2002 | Mancini | F02M 25/08 123/516 |
| 6,487,892 | B1 * | 12/2002 | Ito | F02M 25/0809 123/520 |
| 8,434,461 | B2 * | 5/2013 | Kerns | F02M 25/089 123/520 |
| 8,439,017 | B2 * | 5/2013 | Peters | F02M 25/0818 123/198 D |
| 8,447,495 | B2 * | 5/2013 | Pearce | B60K 15/03504 123/516 |
| 8,560,167 | B2 * | 10/2013 | Jentz | G01M 3/025 180/441 |
| 8,630,786 | B2 * | 1/2014 | Jackson | F02D 41/0037 123/521 |
| 8,725,347 | B2 * | 5/2014 | Jentz | G01M 3/025 180/441 |
| 9,026,292 | B2 * | 5/2015 | Lindlbauer | B60K 15/035 701/22 |
| 9,163,571 | B2 * | 10/2015 | Dudar | F02M 25/089 |
| 9,284,923 | B2 * | 3/2016 | Kimoto | F02M 25/0836 |
| 9,376,969 | B2 * | 6/2016 | Yang | F02D 41/042 |
| 9,523,317 | B1 * | 12/2016 | Li | F02D 41/0042 |
| 9,599,072 | B2 * | 3/2017 | Dudar | F02M 25/089 |
| 9,926,865 | B2 * | 3/2018 | Kuwabara | F02D 41/004 |
| 2011/0011264 | A1 * | 1/2011 | Makino | B01D 53/0415 96/6 |
| 2011/0079201 | A1 * | 4/2011 | Peters | F02M 25/0818 123/520 |
| 2011/0265768 | A1 * | 11/2011 | Kerns | F02M 25/08 123/521 |
| 2011/0295482 | A1 * | 12/2011 | Pearce | B60K 15/03504 701/102 |
| 2011/0315127 | A1 * | 12/2011 | Jackson | F02M 25/0809 123/521 |
| 2012/0215399 | A1 * | 8/2012 | Jentz | G01M 3/025 701/32.8 |
| 2014/0019002 | A1 * | 1/2014 | Jentz | G01M 3/025 701/32.8 |
| 2014/0102420 | A1 * | 4/2014 | Kimoto | F02M 25/0836 123/520 |
| 2014/0318506 | A1 * | 10/2014 | Yang | F02D 41/042 123/519 |
| 2015/0032307 | A1 * | 1/2015 | Lindlbauer | B60K 15/035 701/22 |
| 2015/0120108 | A1 * | 4/2015 | Dudar | F02M 25/089 701/22 |
| 2015/0337775 | A1 * | 11/2015 | Dudar | F02M 25/089 123/520 |
| 2016/0377003 | A1 * | 12/2016 | Kuwabara | F02D 41/004 123/520 |
| 2017/0036532 | A1 * | 2/2017 | Miura | B60K 15/03519 |

FOREIGN PATENT DOCUMENTS

| | | | | |
|---|---|---|---|---|
| JP | 7-217504 | A | 8/1995 | |
| JP | 2005207345 | A | 8/2005 | |
| JP | 2010-242723 | A | 10/2010 | |
| JP | 2010242723 | A * | 10/2010 | ............ F02M 25/08 |
| JP | 2013-142312 | A | 7/2013 | |
| JP | 2014-058940 | A | 4/2014 | |
| JP | 2014-77422 | A | 5/2014 | |

OTHER PUBLICATIONS

English Translation of Japanese Office Action dated Oct. 31, 2017, for Japanese Application No. 2016-546592 (3 p.).
International Patent Application No. PCT/JP2015/074143 International Search Report dated Nov. 24, 2015 (4 pages).
German Patent Application No. 11 2015 003 576.1, Office Action dated Mar. 21, 2017 (7 pages).

* cited by examiner

VAPORIZED FUEL PROCESSING APPARATUS

CROSS-REFERENCE TO RELATED APPLICATIONS

The present application is a National Phase entry of, and claims priority to, PCT Application No. PCT/JP2015/074143, filed Aug. 27, 2015, which claims priority to Japanese Patent Application No. 2014-176950, filed Sep. 1, 2014, both of which are incorporated herein by reference in their entireties.

STATEMENT REGARDING FEDERALLY SPONSORED RESEARCH OR DEVELOPMENT

Not applicable.

BACKGROUND

The present disclosure relates to a vaporized fuel processing apparatus provided with a closing valve that is provided in a path connecting between a fuel tank and a canister for controlling communication between the fuel tank and the canister.

Prior art discloses a vaporized fuel processing apparatus in which a closing valve is provided in a path connecting a fuel tank and a canister, and the closing valve is closed such that the fuel tank transitions to a sealingly closed state during parking of a vehicle. In the case of this vaporized fuel processing apparatus, if the fuel tank develops a negative pressure under a certain condition, and if the negative pressure becomes large, there is a risk that the fuel tank could be deformed by the negative pressure because the fuel tank is in the sealingly closed state. Japanese Laid-Open Patent Publication No. 2010-242723 discloses a technique of opening a closing valve when a fuel tank has a negative pressure.

BRIEF SUMMARY

However, in the case of the known vaporized fuel processing apparatus as described in Japanese Laid-Open Patent Publication No. 2010-242723, there exists a problem in that the air/fuel ratio of an engine is disturbed if the closing valve is opened during the operation of the engine. The reason this problem occurs is that, if the closing valve is opened during the operation of the engine in a state where the fuel tank has developed a negative pressure, the fuel vapor adsorbed by the canister is returned to the engine to cause a so-called back purge, whereby the fuel vapor drawn into the engine for purging the canister is abruptly reduced.

In view of this problem, there has been a need in the art for a vaporized fuel processing apparatus that can inhibit the air/fuel ratio of the engine from being disturbed when the fuel tank develops a negative pressure during the operation of the engine.

According to a first aspect of the present disclosure, there is provided a vaporized fuel processing apparatus in which fuel vapor within a fuel tank is adsorbed by a canister, the adsorbed vaporized fuel is drawn to an engine, and a closing valve is provided in a path connecting the fuel tank and the canister for controlling communication between the fuel tank and the canister. A purge valve is provided in a path connecting the canister and the engine for controlling communication between the canister and the engine. The vaporized fuel processing apparatus further comprises an internal pressure sensor configured to detect a pressure of a space within the fuel tank as an internal pressure, and closing valve control means configured to open the closing valve for supplying atmospheric pressure to the fuel tank via the canister when the internal pressure sensor detects that the internal pressure of the fuel tank is negative while the purge valve is closed.

With the first aspect of the present disclosure, the opening operation of the closing valve is performed only when the purge operation is not performed, and the opening operation is stopped during the purge operation. Therefore, the opening of the closing valve does not occur at the same time the purge operation is performed, and it is possible to prevent an air/fuel ratio of the engine from being disturbed.

According to a second aspect of the present disclosure, there is provided a vaporized fuel processing apparatus in which fuel vapor within a fuel tank is adsorbed by a canister, the adsorbed vaporized fuel is drawn to an engine, and a closing valve is provided in a path connecting the fuel tank and the canister for controlling communication between the fuel tank and the canister. A purge valve is provided in a path connecting the canister and the engine for controlling communication between the canister and the engine. The vaporized fuel processing apparatus further comprises an internal pressure sensor configured to detect a pressure of a space within the fuel tank as an internal pressure, and closing valve control means configured to open the closing valve for supplying atmospheric pressure to the fuel tank via the canister and to control a degree of opening of the closing valve so as to restrain a variation in the internal pressure of the fuel tank when the internal pressure sensor detects that the internal pressure of the fuel tank is negative while the purge valve is opened.

The second aspect of the present disclosure can be realized by using, as the closing valve, a valve capable of continuously varying a degree of opening and by controlling the degree of opening of the closing valve to an intermediate degree of opening that does not cause an abrupt variation in the internal pressure of the fuel tank.

With the second aspect of the present disclosure, the closing valve is controlled to restrain the variation in the internal pressure of the fuel tank even in the case that the closing valve is opened while the purge operation is being performed, and therefore, it is possible to restrain an abrupt variation in the vaporized fuel drawn into the engine via the purge valve, so that it is possible to prevent an air/fuel ratio of the engine from being disturbed.

According to a third aspect of the present disclosure, if the purge valve is switched from an open to a closed position in a state where the internal pressure sensor detects that the internal pressure of the fuel tank is negative, the closing valve control means may stop the restraining control of the degree of opening of the closing valve performed for restraining the variation in the internal pressure of the fuel tank and opens the closing valve.

According to a fourth aspect of the present disclosure, the closing valve control means may increase the degree of opening of the closing valve with time during opening of the closing valve.

According to a fifth aspect of the present disclosure, the closing valve control means may control the degree of opening of the closing valve such that that the variation in the internal pressure of the fuel tank has a previously-set characteristic during opening of the closing valve.

According to a sixth aspect of the present disclosure, the closing valve control means may control the degree of opening of the closing valve such that a feedback correction amount of an air/fuel ratio of the engine falls within a predetermined range during opening of the closing valve.

DETAILED DESCRIPTION

Figure 1:
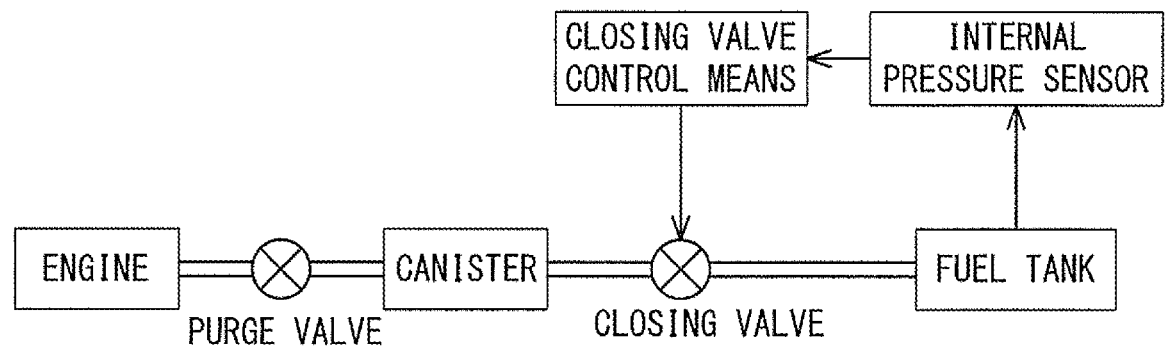
FIG. 1 is a conceptual diagram according to an embodiment of the present disclosure.

FIG. 1 is a conceptual diagram according to an embodiment.

Figure 2:
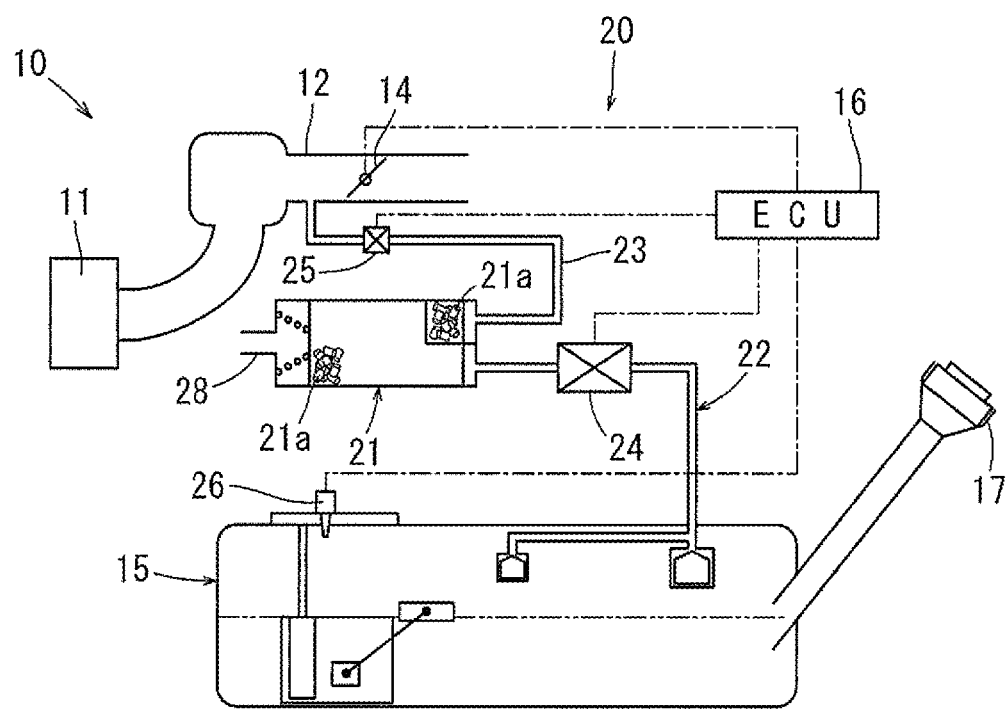
FIG. 2 is a structural view of a system according to a first embodiment.
Figure 3:
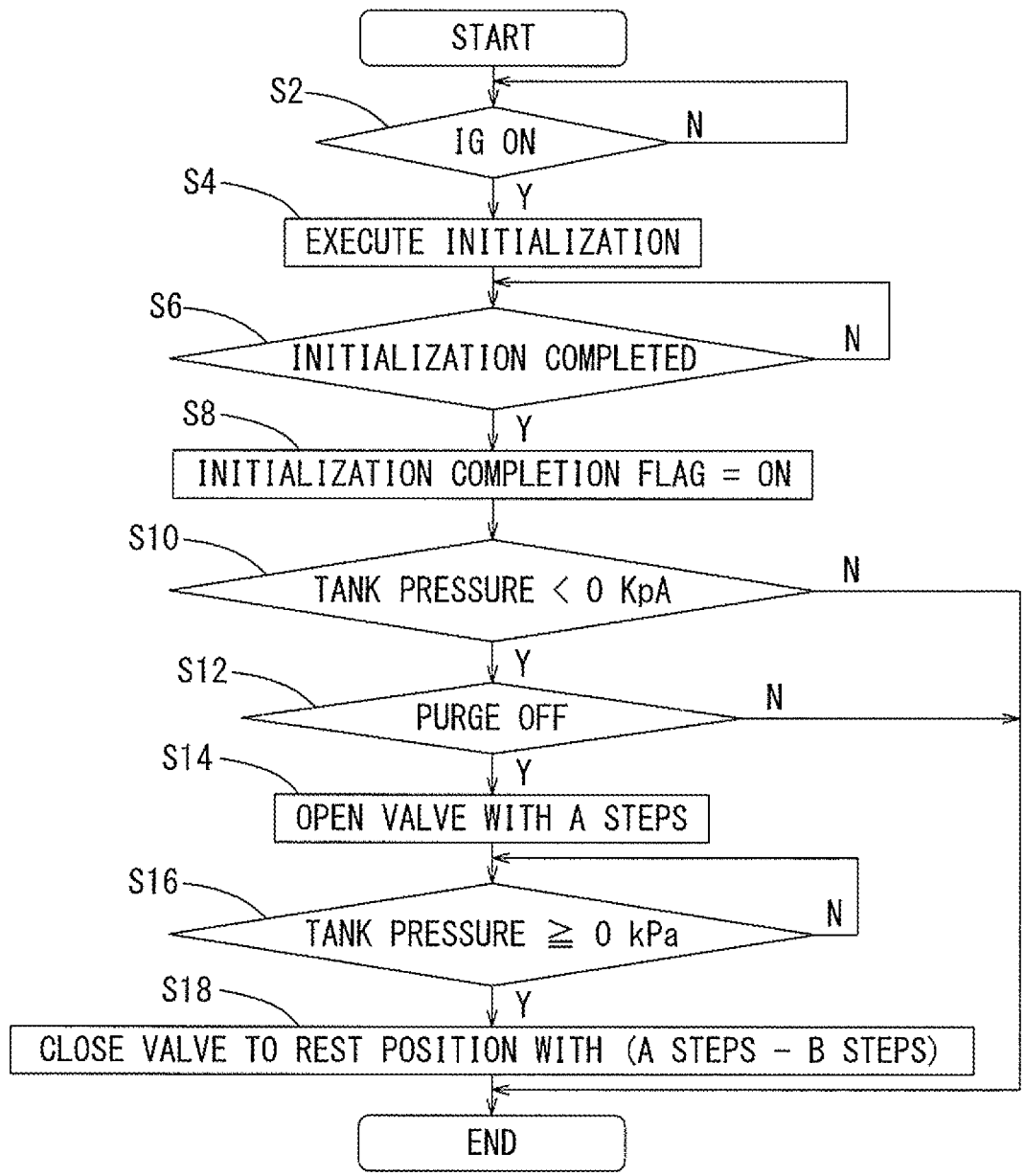
FIG. 3 is a flowchart of a valve opening control process routine for a closing valve according to the first embodiment.

FIGS. 2 and 3 show a first embodiment. As shown in FIG. 2, this embodiment is configured by adding a vaporized fuel processing apparatus 20 to an engine system 10 of a vehicle.

In FIG. 2, the engine system 10 is configured to supply a gas mixture containing fuel mixed with air, to an engine body 11 via an intake passage 12. The air is supplied while its flow rate is controlled by a throttle valve 14, and the fuel is supplied while its flow rate is controlled by a fuel injection valve (not shown in the drawings). Both the throttle valve 14 and the fuel injection valve are connected to a control circuit, the throttle valve 14 supplies a signal related to a valve opening amount of the throttle valve 14 to the control circuit 16, and a valve opening duration of the fuel injection valve is controlled by the control circuit 16. The fuel is supplied to the fuel injection valve and this fuel is supplied from a fuel tank 15.

The vaporized fuel processing apparatus 20 is configured to cause adsorption of fuel vapor produced during refueling or fuel vapor vaporized within the fuel tank 15 (hereinafter called "vaporized fuel") by a canister 21 via a vapor passage 22. The vaporized fuel adsorbed by the canister 21 is supplied to an intake passage 12 at a position on a downstream side of the throttle valve 14 via a purge passage 23. A step motor type closing valve (corresponding to a closing valve according to the present invention, and hereinafter simply called a closing valve) 24 is provided in the vapor passage 22 for opening and closing this passage 22, and a purge valve 25 is provided in the purge passage 23 for opening and closing this passage 23. The closing valve 24 has a region within which the valve is maintained in a closed state until the fuel tank 15 and the canister 21 are brought into a communicating state after a valve opening movement is started by a step motor, and the closing valve 24 is capable of continuously varying a degree of opening.

An activated carbon 21a serving as an adsorbent is filled into the canister 21, and it is configured such that the vaporized fuel from the vapor passage 22 is adsorbed by the activated carbon 21a and that the adsorbed vaporized fuel is discharged to the purge passage 23. An atmospheric passage 28 is also connected to the canister 21, and if an intake negative pressure is applied to the canister 21 via the purge passage 23, the atmospheric air is supplied via the atmospheric passage 28, so that the vaporized fuel is purged via the purge passage 23. Further, if the closing valve 24 is opened in a state where a pressure of a space within the fuel tank 15 is negative, the atmospheric air from the atmospheric passage 28 flows into the fuel tank 15 via the canister 21 and the vapor passage 22, so that a back purge is performed to return the vaporized fuel adsorbed by the canister 21 to the fuel tank 15. The atmospheric passage 28 is opened at a position proximal to a refueling port 17 provided at the fuel tank 15, whereby the atmospheric air is drawn from a position proximal to the refueling port 17.

Various kinds of signals necessary for controlling the valve opening time, etc., of the fuel injection valve are input to the control circuit 16. In the example shown in FIG. 2, other than the valve opening amount signal of the throttle valve 14 described above, a detection signal of a pressure sensor 26 that detects the internal pressure of the fuel tank 15 is input to the control circuit 16. Further, in the example shown in FIG. 2, other than the control of the valve opening time of the fuel injection valve as described above, the control circuit 16 controls the valve opening of both the closing valve 24 and the purge valve 25.

Next, a valve opening control process routine performed by the control circuit 16 for the step motor type closing valve 24 will be described based on a flowchart shown in FIG. 3 with reference to a timechart shown in FIG. 4. If the process of this routine is executed, it is determined in Step S2 as to whether an ignition switch IG (not shown in the drawings) that is a power switch of a vehicle is turned on. After waiting for the ignition switch IG to turn on, if the ignition switch IG is turned on, the determination in Step S2 is YES, and initialization of the closing valve 24 is executed in Step S4. Because the valve opening movement of the closing valve 24 is performed by the step motor, the initialization of the closing valve 24 is a process of preliminary bringing the movement start position of the step motor and the valve opening movement start position of the valve to match each other in order to achieve a state in which the number of movement steps of the step motor and the degree of opening of the valve are correctly correlated to each other without mismatching. After waiting for the initialization in Step S4, if the initialization is completed, the determination in a next Step S6 becomes YES, and an initialization completion flag is set in Step S8 to store an event of completion of the initialization.

Figure 4:
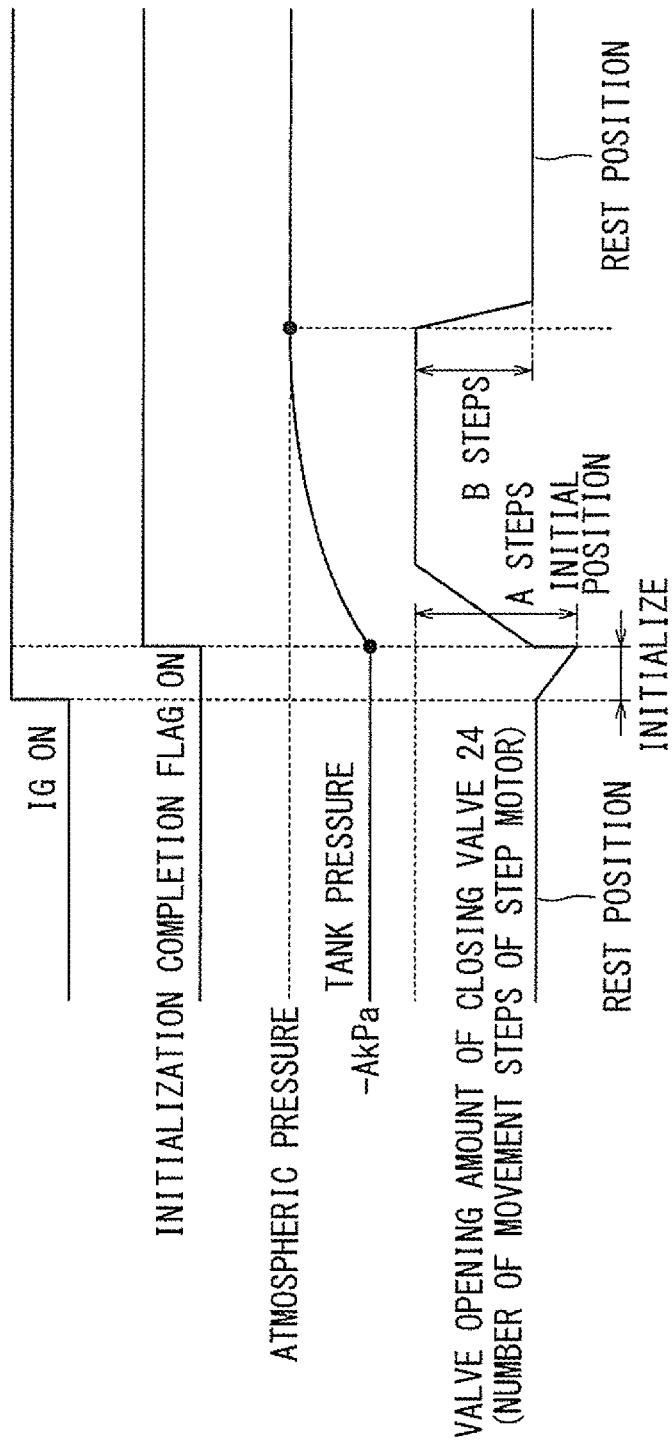
FIG. 4 is a sequential timechart illustrating a valve opening control of the closing valve according to the first embodiment.

A sequential timechart diagram of the valve opening amount of the closing valve 24 shown in FIG. 4 shows that the number of movement steps of the step motor varies from the rest position to the initial position spanning the initialization period. The rest position is a position where the closing valve 24 always rests if the valve opening amount is zero in the valve opening control. The valve opening start position that is a position where the closing valve 24 starts to actually open is previously stored as a learning value, and the closing valve 24 always rests at the valve opening start position in the valve opening control, so that the responsiveness of the valve opening control can be improved. Thus, the valve opening start position of the closing valve 24 is stored as the rest position.

In Step S10, it is determined as to whether the internal pressure of the fuel tank 15 is a negative pressure. If the internal pressure is not a negative pressure, the process of this routine is finished; however, if the internal pressure is a negative pressure, the determination in Step S10 is YES, and it is determined in Step S12 as to whether a purge OFF state where the purge valve 25 is closed is brought. If the purge valve 25 is not closed at that time, the determination in Step S12 is NO, and the process of this routine is finished; however, if the purge valve 25 is closed, the determination in Step S12 is YES, and the closing valve 24 is opened by A steps at a predetermined speed in Step S14.

As shown in FIG. 4, if the closing valve 24 is opened by A steps for the reason that the internal pressure of the fuel tank 15 is a negative pressure (−A kPa in FIG. 4), the closing valve 24 is rapidly opened from the initial position to the rest position of the valve opening amount. Because the valve opening start position that is the rest position of the closing valve 24 is preliminary stored as a learning value, this control shows that the valve opening control of the closing valve 24 is started with excellent responsiveness based on the learning value. The valve is opened from the rest position at a predetermined speed.

In Step S16, the internal pressure of the fuel tank 15 is continuously monitored until the internal pressure of the fuel tank 15 becomes a positive pressure. As described above, if the closing valve 24 is opened, atmospheric air flows from the atmospheric passage 28 of the canister 21 into the fuel tank 15 via the canister 21 and the closing valve 24, so that the internal pressure of the fuel tank 15 varies from the negative pressure to approach the atmospheric pressure. Once the internal pressure of the fuel tank 15 reaches the atmospheric pressure, the determination in Step S16 becomes YES, and the closing valve 24 is closed by B steps in Step S18, so that the closing valve 24 is closed to take a position corresponding to (A−B) steps. This position is determined to be the rest position.

According to the above first embodiment, if the internal pressure of the fuel tank 15 is a negative pressure when the closing valve 24 is closed, and if the purge valve 25 is closed when the ignition switch IG is turned on, the closing valve 24 is opened, so that the atmospheric air is supplied into the fuel tank 15 from the atmospheric passage 28 of the canister 21. In this way, the fuel tank 15 is prevented from being deformed by the negative pressure. In addition, because this opening control of the closing valve 24 is not performed when the purge valve 25 is opened, it is possible to prevent the air/fuel ratio of the engine from being disturbed by a back purge that is caused by opening the closing valve 24 when the fuel tank 15 is in a state of a negative pressure.

Figure 5:
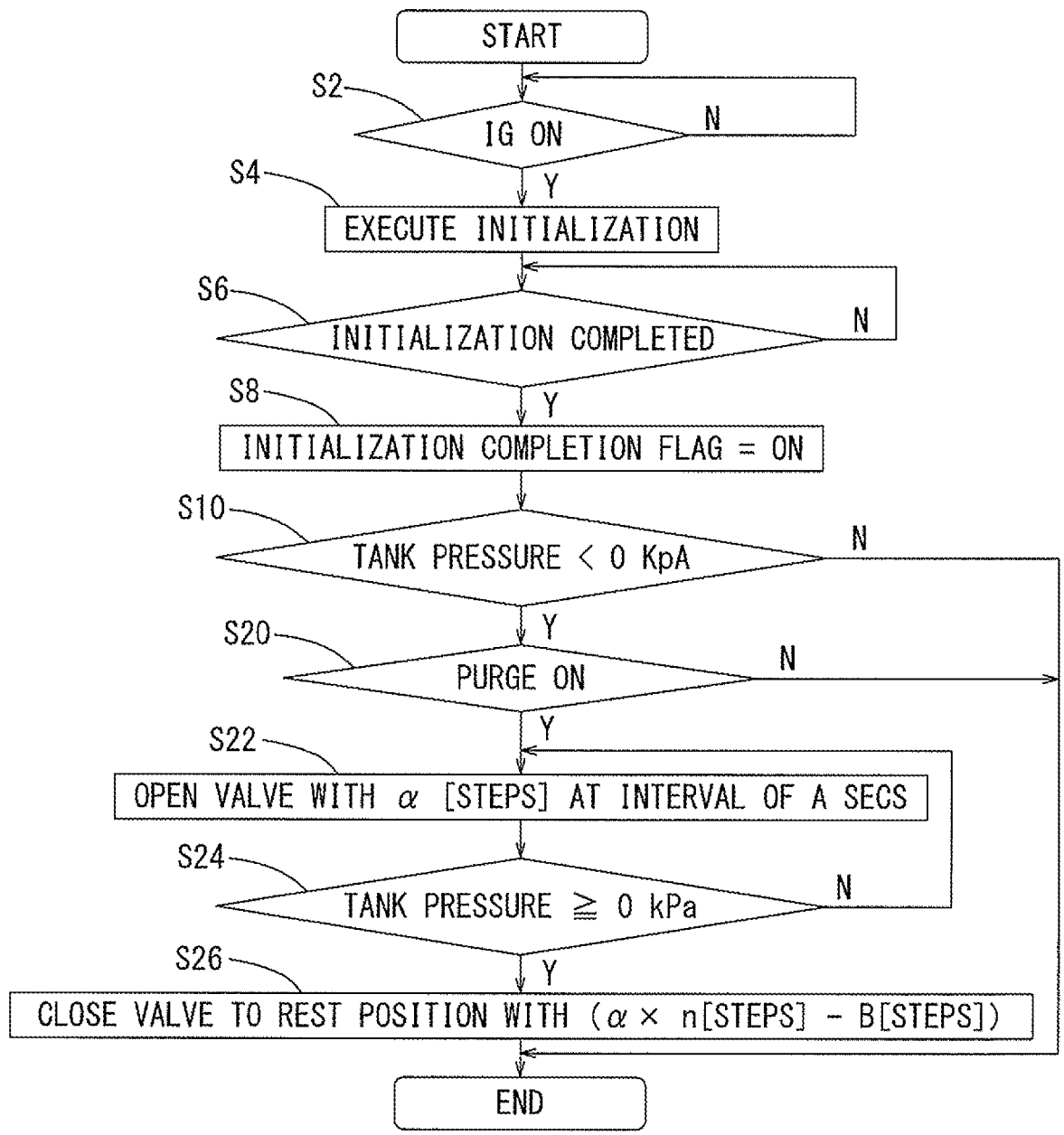
FIG. 5 is a flowchart of a valve opening control process routine for a closing valve according to a second embodiment.

FIG. 5 shows a valve opening control process routine of the closing valve 24 according to a second embodiment. The second embodiment is characterized in that, in contrast to the first embodiment, the valve opening control of the closing valve 24 performed when the fuel tank 15 is in the negative pressure state in the first embodiment is performed during opening of the purge valve 25, and that the closing valve 24 is gradually opened. In other respects, the second embodiment is the same as the first embodiment, and a repeated explanation of the same components will be omitted.

Figure 6:
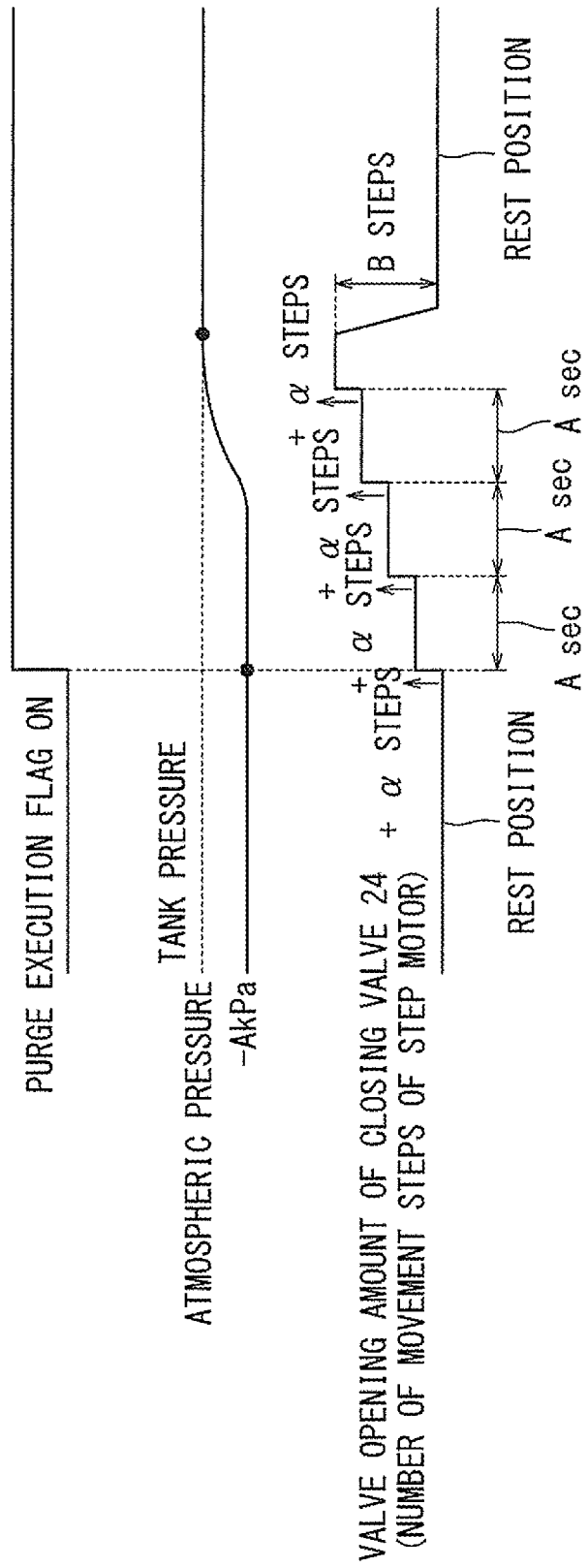
FIG. 6 is a sequential timechart illustrating a valve opening control of the closing valve according to the second embodiment.

In FIG. 5, the processes from Step S2 to Step S10 are the same as the processes from Step S2 to Step S10 in FIG. 3. In Step S20, it is determined as to whether the purge valve 25 is opened to achieve a purge ON state. If the purge valve 25 is not opened, the determination in Step S20 is NO, and this routine is finished. If the purge valve 25 is opened, the determination of the purge ON state in Step S20 is YES, and the closing valve 24 is opened in Step S22 by a steps per A seconds as shown in FIG. 6. Next, in Step S24, it is determined as to whether the internal pressure of the fuel tank 15 has become to be a positive pressure, and the closing valve 24 is opened until the internal pressure becomes to be a positive pressure. If the determination in Step S24 is YES as a result of the internal pressure of the fuel tank 15 being the positive pressure, the closing valve 24 is closed by B steps in Step S26, so that the closing valve 24 is closed to a position corresponding to ($\alpha \times n - B$) steps. This position is determined to be the rest position. Here, n denotes the number of times of opening the closing valve 24 in Step S22.

According to the second embodiment, if the internal pressure of the fuel tank 15 is a negative pressure while the closing valve 24 is closed, and if the purge valve 25 is opened when the ignition switch IG is turned on, the closing valve 24 is gradually opened, so that the atmospheric air is gently supplied into the fuel tank 15 from the atmospheric passage 28 of the canister 21. This process may prevent the fuel tank 15 from being deformed by the negative pressure. In addition, because the control for opening the closing valve 24 is gradually performed, a back purge is not abrupt even if it occurs; therefore, the control of the air/fuel ratio of the engine can follow the variation in the purge amount, so that it is possible to prohibit the air/fuel ratio from being disturbed.

Figure 7:
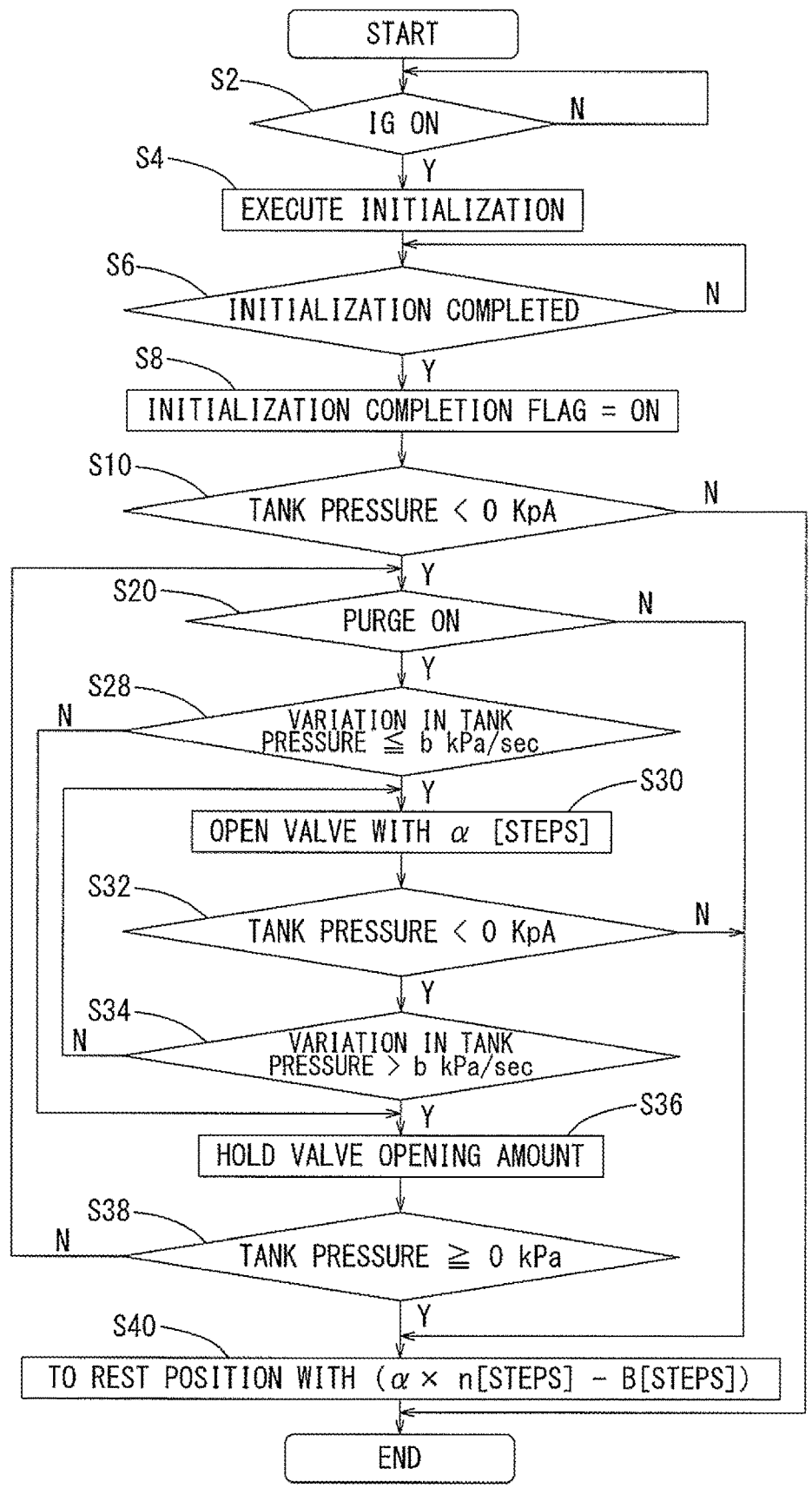
FIG. 7 is a flowchart of a valve opening control process routine for a closing valve according to a third embodiment.

FIG. 7 shows a valve opening control process routine of the closing valve 24 according to a third embodiment of the present disclosure. The third embodiment is characterized in that, in contrast to the first embodiment, the valve opening control of the closing valve 24 performed when the fuel tank 15 is in the negative pressure state in the first embodiment is performed during opening of the purge valve 25, and that the opening of the closing valve 24 is performed in such a manner that a variation in the internal pressure of the fuel tank 15 stays within a predetermine value range. In other respects, the third embodiment is the same as the first embodiment, and a repeated explanation of the same components will be omitted.

Figure 8:
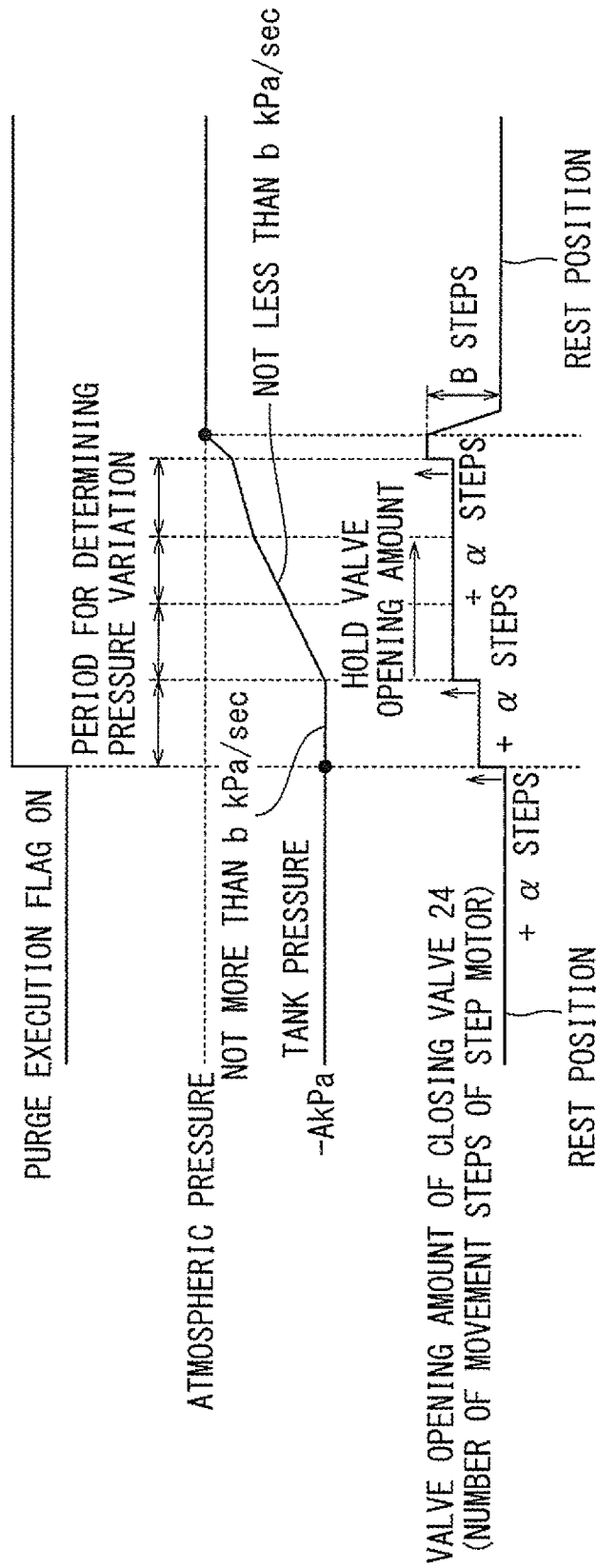
FIG. 8 is a sequential timechart illustrating a valve opening control of the closing valve according to the third embodiment.

In FIG. 7, the processes from Step S2 to Step S20 are the same as the processes from Step S2 to Step S20 in FIG. 5. In Step S28, it is determined as to whether a variation in the internal pressure of the fuel tank 15 is within the predetermined value range. More specifically, it is determined as to whether the variation in the tank internal pressure is equal to or less than b kPa/sec. If the variation is within the predetermined value range, and therefore, if the determination in Step S28 is YES, the closing valve 24 is opened in Step S30 by a steps as shown in FIG. 8. Next, in Step S32, it is determined as to whether the internal pressure of the fuel tank 15 is a negative pressure, and if it is a negative pressure, the determination in Sep S32 is YES, and after that, it is determined in Step S34 as to whether the variation in the internal pressure of the fuel tank 15 is larger than the predetermined value (b kPa/sec). If the variation in the internal pressure is not larger than the predetermined value, and therefore, if the determination in Step S34 is NO, the process returns to Step S30 where the closing valve 24 is again opened by a steps. After that, the processes in Step S32 and Step S34 are repeated, and if the variation in the internal pressure is larger than the predetermined value, and therefore, if the determination in Step S34 is YES, the valve opening amount of the closing valve 24 is held in Step S36. In this case, the valve opening amount of the closing valve 24 is maintained without being varied until the variation in the internal pressure of the fuel tank 15 is not larger than the predetermined value (b kPa/sec) as shown in FIG. 8. Next, in Step S38, it is determined as to whether the internal pressure of the fuel tank 15 is at a positive pressure, and the processes in the steps after Step S20 are repeated until a positive pressure is resulted. If the variation in the internal pressure of the fuel tank 15 falls within the predetermined value range during holding the valve opening amount, the determination in Step S28 becomes YES, so that the closing valve 24 is again opened by a steps in Step S30. After that, if the internal pressure of the fuel tank 15 becomes a positive pressure, and therefore, if the determination in Step S38 is YES, the closing valve 24 is closed by B steps in Step S40, and therefore, the closing valve 24 is closed to a position corresponding to (α×n−B) steps. This position is determined to be the rest position. Here, n denotes the number of times of opening the closing valve 24 in Step S30.

After performing the control step for opening the closing valve 24 in Step S30, if the internal pressure of the fuel tank 15 becomes a positive pressure such that it results the determination in Step S32 being NO, or if the purge valve 25 is closed such that it results the determination in Step S20 being NO, the closing valve 24 is closed to the rest position in the above-mentioned Step S40.

According to the third embodiment, if the internal pressure of the fuel tank 16 becomes a negative pressure during closing of the closing valve 24, and if the purge valve 25 is opened when the ignition switch IG is turned on, the closing valve 24 is gradually opened in such a manner that the variation in the internal pressure of the fuel tank 14 is within the predetermined value range, whereby the atmospheric air is gently supplied from the atmospheric passage 28 of the canister 21 into the fuel tank 15. This may prevent the fuel tank 15 from being deformed by the negative pressure. In addition, because the control for opening the closing valve 24 is gradually performed, a back purge even if it occurs is not abrupt; therefore, the air/fuel ratio control of the engine can follow the variation in the purge amount, so that it is possible to prohibit the air/fuel ratio from being disturbed.

Figure 9:
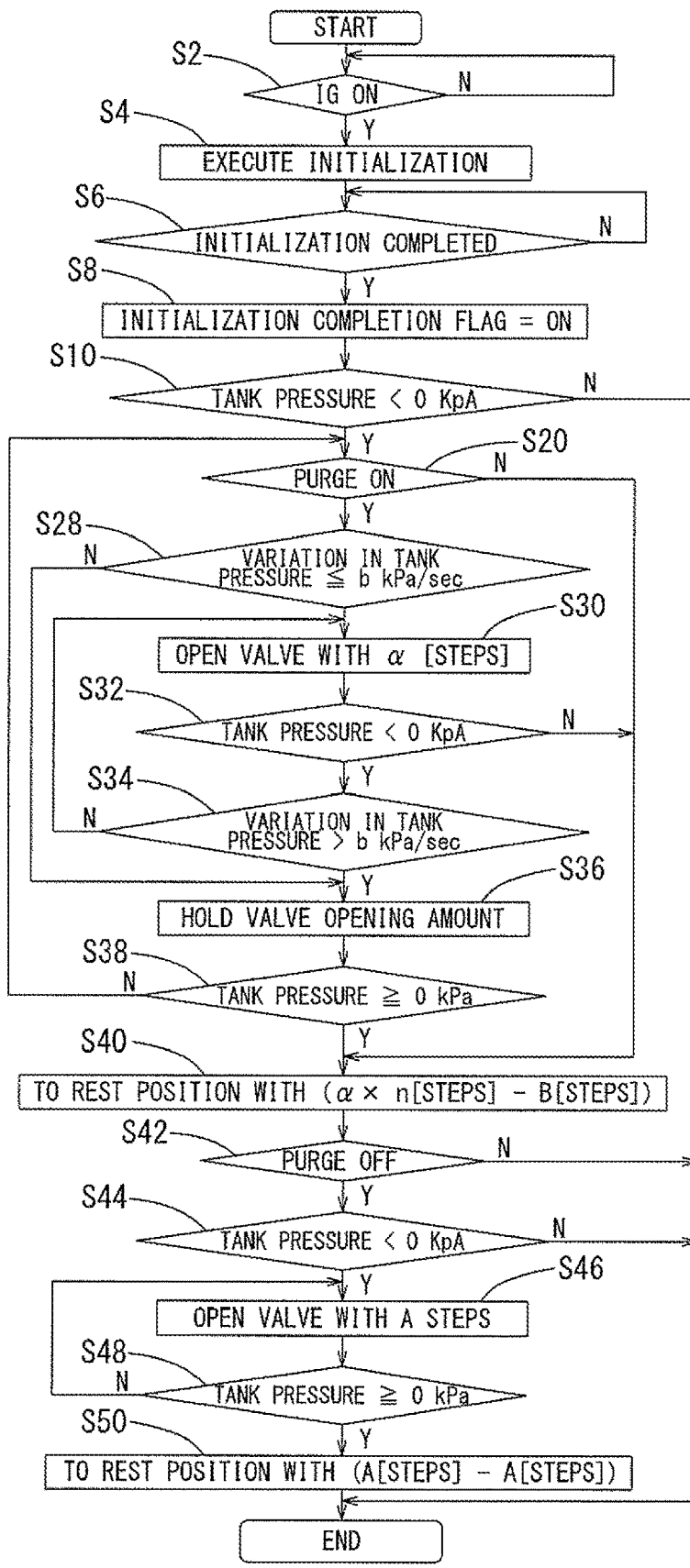
FIG. 9 is a flowchart of a valve opening control process routine for a closing valve according to a fourth embodiment.

FIG. 9 shows a valve opening control process routine of the closing valve 24 according to a fourth embodiment of the present disclosure. The fourth embodiment is characterized in that, in contrast to the first embodiment, the valve opening control of the closing valve 24 performed when the fuel tank 15 is in the negative pressure state in the first embodiment is made during opening of the purge valve 25, and that the opening of the closing valve 24 is performed in such a manner that a variation in the internal pressure of the fuel tank 15 is within a predetermine value range, and that, if the purge valve 25 is closed from this state, the closing valve 24 is once closed and is again opened after that. In other respects, the fourth embodiment is the same as the first embodiment, and a repeated explanation of the same components will be omitted.

Figure 10:
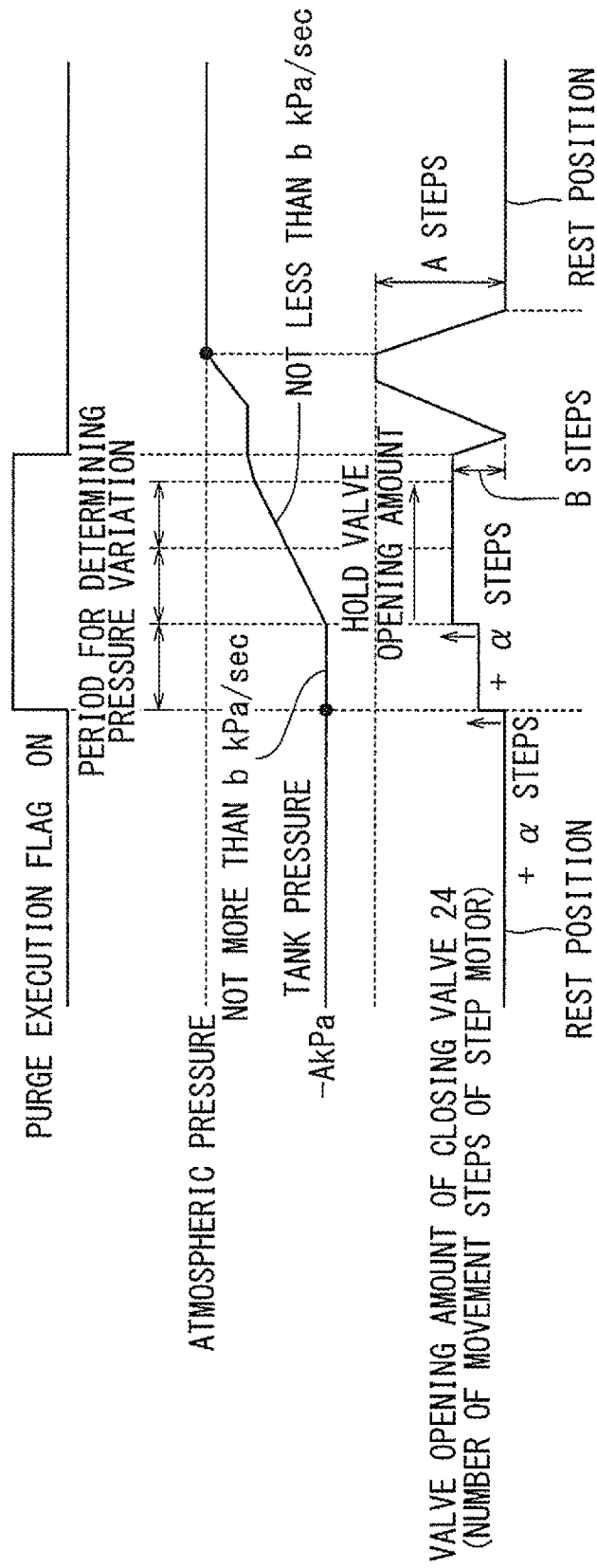
FIG. 10 is a sequential timechart illustrating a valve opening control of the closing valve according to the fourth embodiment.

In FIG. 9, the processes from Step S2 to Step S40 are the same as the processes from Step S2 to Step S40 in FIG. 7. In Step S42, it is determined as to whether it is a purge OFF state where the purge valve 25 is closed. If the purge valve 25 is opened at the time of determination, the determination in Step S42 is NO, and the process of this routine is finished. If the purge valve 25 is closed, the determination in Step S42 is YES, and after that, it is determined in Step S44 as to whether the internal pressure of the fuel tank 15 is still in the negative state. If the internal pressure is a positive pressure, the determination in Step S44 is NO, and the process of this routine is finished. If the internal pressure of the fuel tank 15 is still in the negative state, the determination in Step S44 is YES, and after that, the closing valve 24 is opened in Step S46 by A steps as shown in FIG. 10. Next, in Step S48, it is determined as to whether the internal pressure of the fuel tank 15 has become a positive pressure, and if a positive pressure is resulted, the closing valve 24 is closed by A steps in Step S50, so that the closing valve 24 is closed to the rest position that corresponds to (A-A) steps.

According to the fourth embodiment, if the internal pressure of the fuel tank 16 becomes negative during closing of the closing valve 24, and if the purge valve 25 is opened when the ignition switch IG is turned on, the closing valve 24 is gradually opened in such a manner that the variation in the internal pressure of the fuel tank 14 falls within the predetermined value range, whereby the atmospheric air is gently supplied from the atmospheric passage 28 of the canister 21 into the fuel tank 15. This may prevent the fuel tank 15 from being deformed by the negative pressure. In addition, because the control for opening the closing valve 24 is gradually performed, a back purge even if it occurs is not abrupt; therefore, the air/fuel ratio control of the engine can follow the variation in the purge amount, so that it is possible to prohibit the air/fuel ratio from being disturbed. Further, if the fuel tank 15 is still in the negative pressure state when the purge valve 25 is closed to finish the opening control of the closing valve 24 during introduction of the atmospheric air into the fuel tank 15 by the opening control of the closing valve 24, the closing valve 24 is again opened to supply the atmospheric air into the fuel tank 15, so that the internal pressure of the fuel tank 15 is prevented from being held in negative.

In the fourth embodiment, when the purge valve 25 is opened, the control for opening the closing valve 24 is performed in such a manner that the variation in the internal pressure of the fuel tank 15 falls within the predetermine value range, however, it may be possible to configure such that the closing valve 24 is opened at a constant gentle speed without considering the variation in the internal pressure of the fuel tank 15 as in the second embodiment (FIGS. 5 and 6).

Figure 11:
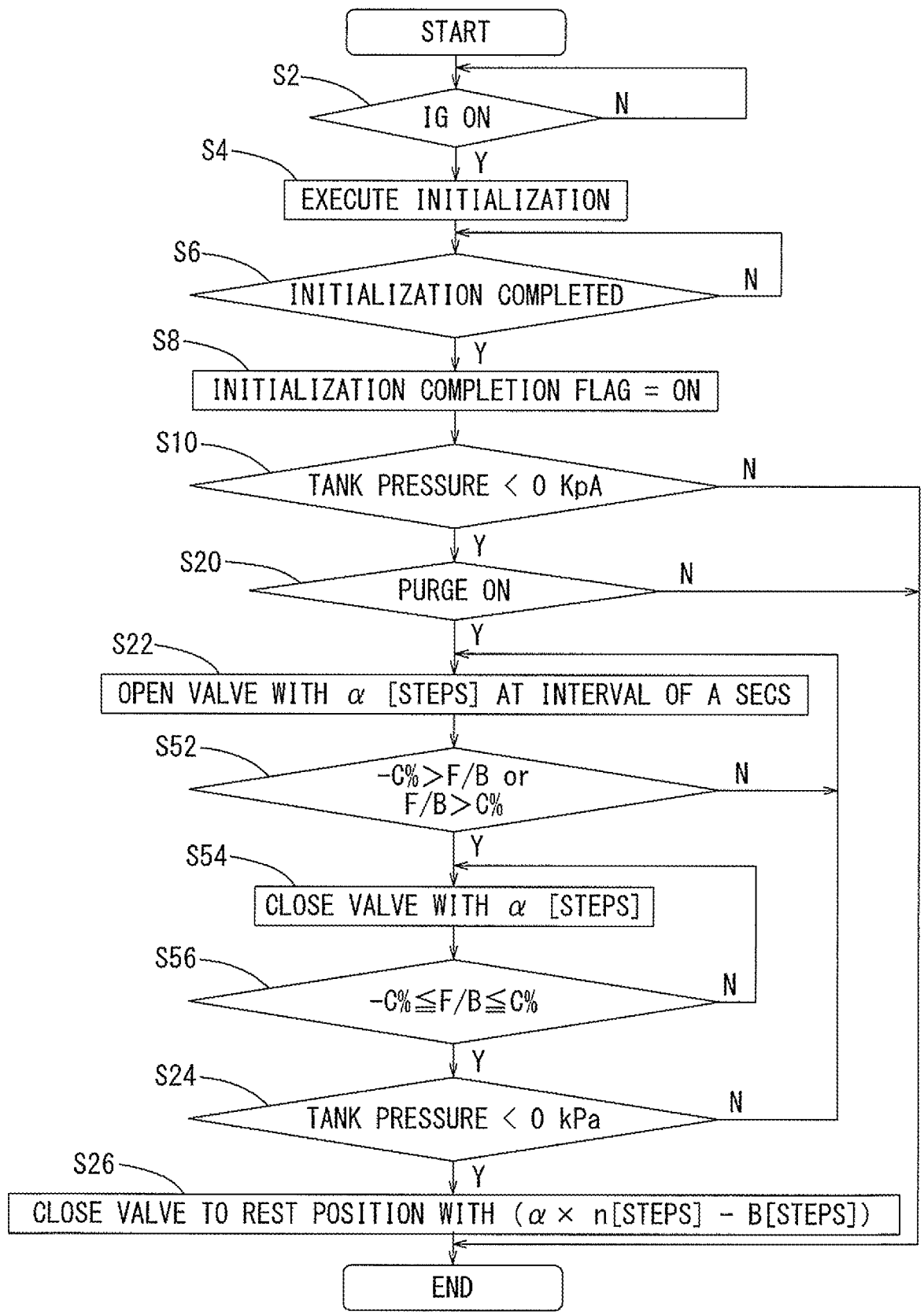
FIG. 11 is a flowchart of a valve opening control process routine for a closing valve according to a fifth embodiment.

FIG. 11 shows a valve opening control process routine of the closing valve 24 according to a fifth embodiment of the present disclosure. The fifth embodiment is characterized in that, in contrast to the first embodiment, the valve opening control of the closing valve 24 performed when the fuel tank 15 is in the negative pressure state in the first embodiment is performed during opening of the purge valve 25, and that the valve opening amount of the closing valve 24 is controlled such that a feedback correction amount of the air/fuel ratio falls within a predetermined range. In other respects, the fifth embodiment is the same as the first embodiment, and a repeated explanation of the same components will be omitted.

Figure 12:
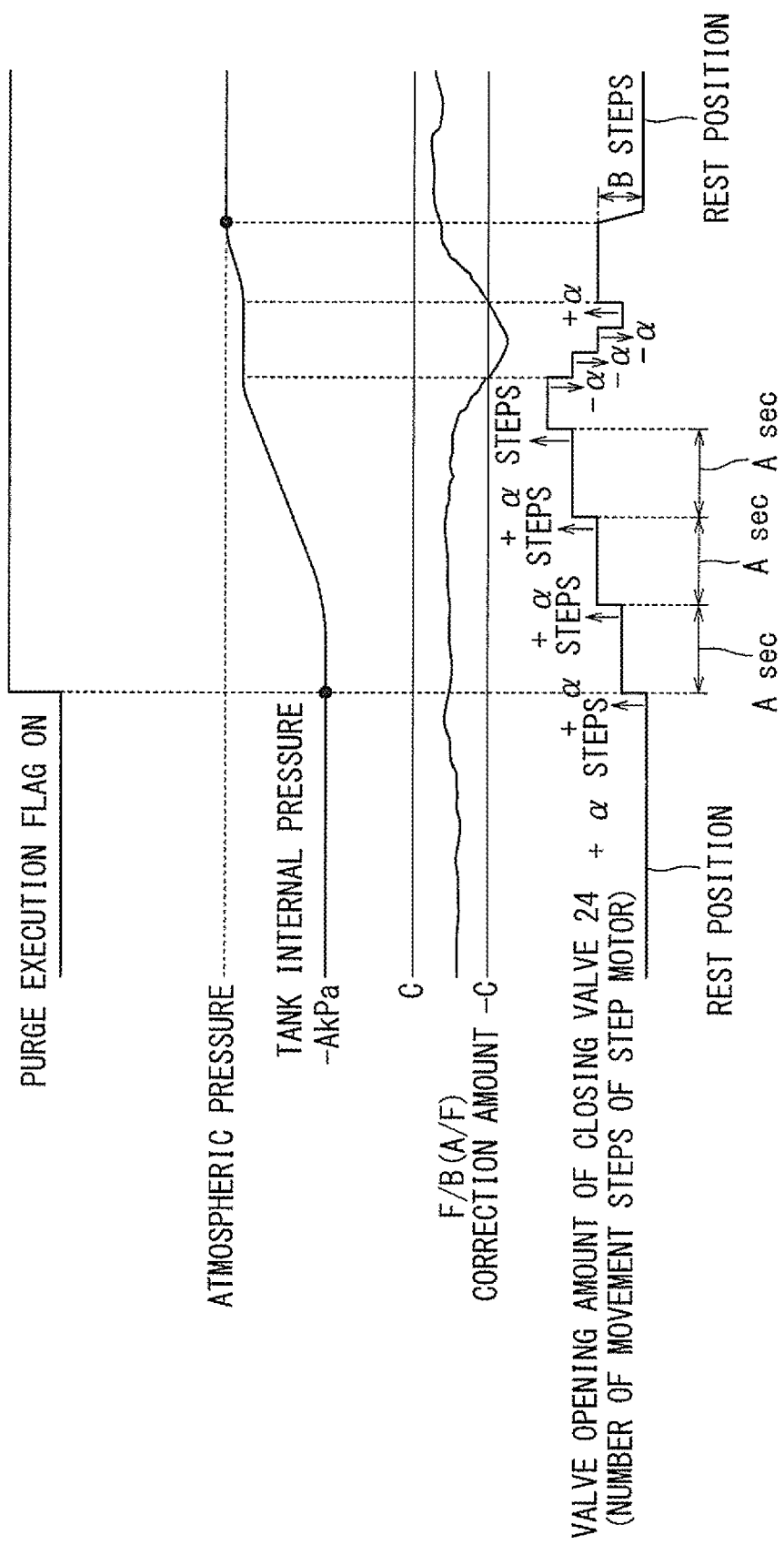
FIG. 12 is a sequential timechart illustrating a valve opening control of the closing valve according to the fifth embodiment.

In FIG. 11, the processes from Step S2 to Step S22 are the same as the processes from Step S2 to Step S22 in FIG. 5. In Step S52, it is determined as to whether a feedback correction amount F/B is outside of a predetermined range (a range of (−C % to +C %)). If the feedback correction amount F/B is within the predetermined range (the range of (−C % to +C %)), and therefore, if the determination in Step S52 is NO, the process returns to Step S22 where the closing valve 24 is opened by a steps per A seconds as shown in FIG. 12. If the feedback correction amount F/B falls outside of the predetermined range (the range of (−C % to +C %)), and therefore, if the determination in Step S52 is YES, the closing valve 24 is closed in Step S54 by a steps as shown in FIG. 12. Next, in Step S56, it is determined as to whether the feedback correction amount F/B falls within the predetermined range (the range of (−C % to +C %)). The process in Step S54 is repeated until the feedback correction amount F/B falls within the predetermined range, and if the feedback correction amount F/B falls within the predetermined range, the determination in Step S56 is YES, and, by the processes performed after Step S24, the closing valve 24 is opened (by Step S22) or closed (by Step S54) in such a manner that the feedback correction amount F/B falls within the predetermined range until the internal pressure of the fuel tank 15 becomes positive; and if the internal pressure of the fuel tank 15 becomes positive, the closing valve 24 is closed to the rest position in Step S26. Here, n denotes the number of times of closing the closing valve 24 in Step S54.

According to the fifth embodiment, if the internal pressure of the fuel tank 16 is negative during closing of the closing valve 24, and if the purge valve 25 is opened when the ignition switch IG is turned on, the closing valve 24 is controlled to be gradually opened or closed in such a manner that the feedback correction amount F/B falls within the predetermined range, whereby the atmospheric air is gently supplied from the atmospheric passage 28 of the canister 21 into the fuel tank 15. This may prevent the fuel tank 15 from being deformed by the negative pressure. In addition, because the opening and closing control of the closing valve 24 is performed in such a manner that the feedback correction amount F/B falls within the predetermined range, it is possible to prohibit the air/fuel ratio from being disturbed even in case that a back purge occurs due to the opening of the closing valve 24.

In the fifth embodiment, if the determination in Step S52 is YES because the feedback correction amount F/B is outside of the predetermined range (the range of (−C to +C)), the valve opening amount of the closing valve 24 is closed by a steps in Step S54, however, the manner of controlling the closing valve 24 for closing it is not limited to this manner. For example, it may be also possible to close at a predetermined speed until reaching the rest position. Alternatively, it may be possible to close by a steps per A seconds as in the case of opening the closing valve 24 in Step S22.

The process in the flowchart of each of the above embodiments corresponds to a closing valve control means according to the present disclosure.

Although the specific embodiments have been described, the present disclosure is not limited to the appearances and constructions of these embodiments, and it is possible to make various changes, additions and omissions. For example, although the closing valve in the above embodiments is the step motor type closing valve 24, it may also be a ball valve configured to continuously vary the valve opening amount according to the rotation of a ball-shaped valve member. Further, although the present disclosure is applied to a vehicle engine system, the present disclosure may not be limited to the application to the vehicle engine system. In case of the application to the vehicle engine system, it may be possible to also be applied to a hybrid vehicle where an engine and a motor are used in a combination.

The invention claimed is:

1. A vaporized fuel processing apparatus comprising:
   a canister configured to adsorb fuel vapor generated within a fuel tank of a vehicle, the adsorbed vaporized fuel being capable to be drawn to an engine from the canister;
   a closing valve provided in a path connecting the fuel tank and the canister for controlling communication between the fuel tank and the canister;
   a purge valve provided in a path connecting the canister and the engine for controlling communication between the canister and the engine;
   an internal pressure sensor configured to detect a pressure of a space within the fuel tank as an internal pressure; and
   a control circuit configured to control a degree of opening of the closing valve so as to restrain a variation in the internal pressure of the fuel tank, when the internal pressure sensor detects that the internal pressure of the fuel tank is negative, while the purge valve is opened during operation of the engine and while supplying an atmospheric pressure to the fuel tank via the canister.

2. The vaporized fuel processing apparatus according to claim 1, wherein:
   the control circuit is configured to increase the degree of opening of the closing valve with time during opening of the closing valve.

3. The vaporized fuel processing apparatus according to claim 1, wherein:
   the control circuit is configured to control the degree of opening of the closing valve in such a manner that the variation in the internal pressure of the fuel tank has a previously-set characteristic during opening of the closing valve.

4. The vaporized fuel processing apparatus according to claim 1, wherein:
   the control circuit is configured to control the degree of opening of the closing valve in such a manner that a feedback correction amount of an air/fuel ratio of the engine falls within a predetermined range during opening of the closing valve.

5. The vaporized fuel processing apparatus according to claim 1, wherein:
   if the purge valve is changed from open to close in a state in which the internal pressure sensor detects that the internal pressure of the fuel tank is negative, the control circuit is configured to stop the control of the degree of opening of the closing valve for restraining the variation in the internal pressure of the fuel tank and open the closing valve.

6. The vaporized fuel processing apparatus according to claim 5, wherein:
   the control circuit increases the degree of opening of the closing valve with time during opening of the closing valve.

7. A vaporized fuel processing apparatus comprising:
   a canister configured to adsorb fuel vapor generated within a fuel tank of a vehicle via a vapor passage which extends from the tank to the canister and connects the tank with the canister, wherein the canister comprises an adsorbent as well as an atmospheric passage which supplies atmospheric air if a negative intake pressure is applied to the canister, wherein the adsorbed vaporized fuel in the canister is configured to be drawn to an engine from the canister via a purge passage, separate from the vapor passage, which extends from the canister to the engine and connects the canister with the engine;

a closing valve provided in the vapor passage, the closing valve configured to open and close the vapor passage, controlling communication between the fuel tank and the canister;
a purge valve provided in the purge passage, the purge valve configured to open and close the purge passage, controlling communication between the canister and the engine;
an internal pressure sensor configured to detect a pressure of a space within the fuel tank as an internal pressure; and
a closing valve control device comprising an ECU with control logic and control circuits connected to the purge and closing valves and the internal pressure sensor, the closing valve control device configured to perform a control process routine, wherein during operation of the engine, first an initialization process of the closing valve is completed, second the fuel tank internal pressure reading of the internal pressure sensor is checked, and if said reading is negative, then subsequent valve opening and/or closing steps are repeatedly taken until the tank internal pressure reading is raised to atmospheric or positive pressure;
wherein the initialization process comprises moving the closing valve from a rest position to a valve opening start position;
wherein the closing valve is a step-motor-type closing valve, wherein the initialization process of the closing valve control device comprises achieving a state where a number of movement steps of the step motor correctly corresponds to a certain degree of opening the valve, wherein an initialization completion flag is set upon achieving said state;
wherein the valve opening start position where the closing valve starts to open is stored as a learning value or previously-set characteristic within the control circuit so that the closing valve always rests at said valve opening start position in the valve opening control process immediately before and after the initialization process, where said valve opening start position becomes a rest position of the control process routine to improve responsiveness in valve opening control; and
wherein the subsequent valve opening and/or closing steps of the control process routine of the closing valve control device comprises opening the closing valve if the purge valve is detected as open, wherein the step-motor-type closing valve is gradually opened by a fixed number of motor steps over a specific time period so as to not cause an abrupt variation in the fuel supply to the engine, corresponding to a specific degree of valve opening per interval of time, wherein after each opening the tank pressure is monitored at regular intervals, and if the tank pressure is still negative, the opening step is repeated, and once the tank pressure is not negative, where it is at atmospheric or positive pressure, the control process routine closes the closing valve by a number of steps per opening multiplied by a number of iterations of the opening step subtracted by a specific number of steps so that the rest position which corresponds to the valve opening start position is achieved.

8. A vaporized fuel processing apparatus comprising:
a canister configured to adsorb fuel vapor generated within a fuel tank of a vehicle via a vapor passage which extends from the tank to the canister and connects the tank with the canister wherein the canister comprises an adsorbent as well as an atmospheric passage which supplies atmospheric air if a negative intake pressure is applied to the canister, wherein the adsorbed vaporized fuel in the canister is configured to be drawn to an engine from the canister via a purge passage, separate from the vapor passage, which extends from the canister to the engine and connects the canister with the engine;
a closing valve provided in the vapor passage, the closing valve configured to open and close the vapor passage, controlling communication between the fuel tank and the canister;
a purge valve provided in the purge passage, the purge valve configured to open and close the purge passage, controlling communication between the canister and the engine;
an internal pressure sensor configured to detect a pressure of a space within the fuel tank as an internal pressure; and
a closing valve control device comprising an ECU with control logic and control circuits connected to the purge and closing valves and the internal pressure sensor, the closing valve control device configured to perform a control process routine, wherein during operation of the engine, first an initialization process of the closing valve is completed, second the fuel tank internal pressure reading of the internal pressure sensor is checked, and if said reading is negative, then subsequent valve opening and/or closing steps are repeatedly taken until the tank internal pressure reading is raised to atmospheric or positive pressure;
wherein the initialization process comprises moving the closing valve from a rest position to a valve opening start position;
wherein the closing valve is a step-motor-type closing valve, wherein the initialization process of the closing valve control device comprises achieving a state where a number of movement steps of the step motor correctly corresponds to a certain degree of opening the valve, wherein an initialization completion flag is set upon achieving said state;
wherein the valve opening start position where the closing valve starts to open is stored as a learning value or previously-set characteristic within the control circuit so that the closing valve always rests at said valve opening start position in the valve opening control process immediately before and after the initialization process, where said valve opening start position becomes a rest position of the control process routine to improve responsiveness in valve opening control; and
wherein the subsequent valve opening and/or closing steps of the control process routine of the closing valve control device comprises checking the variation in tank pressure by measuring the internal tank pressure through the internal pressure sensor over a period of time, if the purge valve is detected as open, wherein if the variation is within a predetermined range of variation of pressure over time, the step-motor-type closing valve is configured to gradually open by a fixed number of motor steps, wherein after the opening step the variation in tank pressure is again measured so as to not cause an abrupt variation in the fuel supply to the engine, where as long as the variation is inside the predetermined range, the opening step is repeated, and once the variation in pressure is outside the predetermined range, the valve opening position is held and the internal fuel tank pressure is rechecked, wherein if the pressure is still negative, the entire process of the subsequent valve opening and/or closing steps is repeated, and if the pressure is positive, the control process routine may close the closing valve by a number of steps per opening multiplied by a number of iterations of the opening step subtracted by a specific number of steps so that the rest position which corresponds to the valve opening start position is achieved.

\* \* \* \* \*